(12) United States Patent
Imai

(10) Patent No.: US 8,913,314 B2
(45) Date of Patent: Dec. 16, 2014

(54) SCANNING DEVICE, IMAGE DISPLAY DEVICE, AND METHOD FOR CONTROLLING IMAGE DISPLAY DEVICE

(75) Inventor: Hiroshi Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 13/515,716

(22) PCT Filed: Dec. 14, 2010

(86) PCT No.: PCT/JP2010/072474
§ 371 (c)(1),
(2), (4) Date: Jun. 13, 2012

(87) PCT Pub. No.: WO2011/074572
PCT Pub. Date: Jun. 23, 2011

(65) Prior Publication Data
US 2012/0257267 A1  Oct. 11, 2012

(30) Foreign Application Priority Data
Dec. 14, 2009  (JP) .................. 2009-283219

(51) Int. Cl.
*G02B 26/08* (2006.01)
*G02B 26/10* (2006.01)
*H04N 9/31* (2006.01)

(52) U.S. Cl.
CPC ............ *G02B 26/105* (2013.01); *H04N 9/3129* (2013.01)
USPC ..................................... 359/201.1

(58) Field of Classification Search
CPC .... G02B 26/10; G02B 26/101; G02B 26/103; G02B 26/105; G02B 26/12; G02B 26/123; G02B 26/127; G02B 26/128; G02B 27/0905; G02B 27/0933
USPC .......... 359/201.1, 201.2, 204.1, 204.3, 209.1, 359/210.1
See application file for complete search history.

(56) References Cited

U.S. PATENT DOCUMENTS 4,906,061 A   3/1990  Yamaguchi
5,694,180 A  12/1997  Deter et al.
(Continued)

FOREIGN PATENT DOCUMENTS

CN  101587285 A  11/2009
JP   58-057108 A   4/1983
(Continued)

OTHER PUBLICATIONS

International Search Report of PCT/JP2010/072474 dated Jan. 18, 2011.
(Continued)

*Primary Examiner* — Euncha Cherry
(74) *Attorney, Agent, or Firm* — Sughrue Mion, PLLC

(57) ABSTRACT

A scanning device that scans a beam emitted from a light source, includes: a beam condensing unit that condenses the beam emitted from the light source; a beam diverging unit that is arranged on an output side of the beam condensing unit, and diverges the beam condensed by the beam condensing unit; a first scanning unit that is arranged between the beam condensing unit and the beam diverging unit, and scans the beam condensed by the beam condensing unit; and a moving unit that moves at least one of the beam condensing unit and the beam diverging unit along respective optical axis directions thereof, in accordance with a scan angle of the first scanning unit.

7 Claims, 16 Drawing Sheets

(56) References Cited

U.S. PATENT DOCUMENTS

| | | |
|---|---|---|
| 2004/0001239 A1 | 1/2004 | Brukilacchio et al. |
| 2005/0024482 A1 | 2/2005 | Yonekubo |
| 2006/0291039 A1* | 12/2006 | Eda et al. ............... 359/362 |
| 2008/0192323 A1 | 8/2008 | Nakamura et al. |

FOREIGN PATENT DOCUMENTS

| | | |
|---|---|---|
| JP | 07-168123 A | 7/1995 |
| JP | 9133887 A | 5/1997 |
| JP | 2627819 B2 | 7/1997 |
| JP | 1185054 A | 3/1999 |
| JP | 2000-171742 A | 6/2000 |
| JP | 2003-021800 A | 1/2003 |
| JP | 2005-018040 A | 1/2005 |
| WO | 2009078960 A1 | 6/2009 |

OTHER PUBLICATIONS

Office Action, date Nov. 28, 2013, issued by the State Intellectual Property Office of the People's Republic of China, in counterpart Application No. 201080056393.8.

Communication dated Jul. 22, 2014 from the Japanese Patent Office in counterpart Japanese Patent Application No. 2011-546130.

* cited by examiner

SCANNING DEVICE, IMAGE DISPLAY DEVICE, AND METHOD FOR CONTROLLING IMAGE DISPLAY DEVICE

CROSS REFERENCE TO RELATED APPLICATIONS

This application is a National Stage of International Application No. PCT/JP2010/072474 filed Dec. 14, 2010, claiming priority based on Japanese Patent Application No. 2009-283219 filed Dec. 14, 2009, the contents of all of which are incorporated herein by reference in their entirety.

TECHNICAL FIELD

The present invention relates to a scanning device, an image display device, and a method therefor. In particular, the present invention relates to a scanning device that scans laser light to display an image on a projection plane, an image display device and a method therefor.

BACKGROUND ART

Conventionally, there is known a projection-type image display device that projects incoherent light that is emitted from a light such as a halogen lamp or a high-pressure mercury lamp onto a planar image display element such as a liquid-crystal light bulb, and enlarges and projects the emitted light from that image display element by a projection lens on a projection plane to display the image.

In this type of projection-type image display device, since incoherent light is used, there has been the problem of electricity consumption being great, and the problem of the brightness of the display image being low. Also, since the wavelength bandwidth of the incoherent light that is emitted from the light source is wide, it has been difficult to broaden the chromaticity range. Moreover, since a planar image display element is used as the image display element, reducing the size of the device has been difficult. Also, when a display image is not projected within the focal depth of the projection lens, the display image is not in focus. For that reason, there is a need for the user to adjust the focus in accordance with the position of the projection plane, and so there has been the problem of impairing convenience.

As a technique for solving the aforementioned problems, an image display device that uses a laser light source that emits laser light has been proposed or developed. Among such kinds of image display devices, there is a scanning-type image display device that displays an image by projecting laser light that is emitted from a light source onto a projection plane by two-dimensional scanning (horizontal scanning and vertical scanning) with a scanning unit.

In the aforementioned scanning-type image display device, in order to project a large screen in a short projection distance, a scanning unit with a large scan angle is necessary. As the scanning unit, it is possible to use a resonance-type micromechanical mirror or galvano scanner or the like. In this case, when the scan angle is increased, the driving current of the electrostatic actuator or electromagnetic actuator for driving increases, leading to the problem of power consumption becoming large. Also, when the scan angle of the resonance-type micromechanical mirror increases, the durability of the device falls, and there is the risk of the hinge member that rotatably supports the mirror breaking For this reason, obtaining reliability has been a problem.

As technology that solves the aforementioned problems and increases the scan angle of the scanning unit, for example there is the scanning device disclosed in Patent Document 1. FIG. 14 is a diagram for describing the scanning device described in Patent Document 1.

In the scanning device shown in FIG. 14, a scanning unit 131, a condensing lens G1 and a diverging lens G2 are arranged from the light source not shown to the emission side. These are arranged so that the focal position f1 of the emission side of the condensing lens G1 and the focal position f2 of the incident side of the diverging lens G2 agree. According to this constitution, the exit angle θ2 of laser light that is emitted from the diverging lens G2 can be made greater than the entry angle θ1 of the laser light that is incident on the condensing lens G1 from the scanning unit 131. As a result, it is possible to obtain a large scanning range on the projection plane (not shown).

Among such scanning-type image display devices, there is a constitution that has a beam waist arranged on the projection plane in order to broaden the range of adjusting the focus, and to display a high-definition image (for example, refer to Patent Document 2).

PRIOR ART DOCUMENTS

Patent Documents

[Patent Document 1] Japanese Unexamined Patent Application, First Publication No. 2005-18040
[Patent Document 2] Japanese Unexamined Patent Application, First Publication No. 2003-21800

SUMMARY OF THE INVENTION

Problem to be Solved by the Invention

In recent years, technology has been developed that, with securing a large scanning range on a projection plane, arranges a beam waist on the projection plane to display on the projection plane a high-definition image that is in focus through the entire screen.

In the image display device shown in FIG. 15A, a diverging lens 142 with a focal distance f2 is arranged between a point A and a point B. The point A is the focal point on the output side of the condensing lens 141. The point B is a point that is made to move from the point A to the light source side by the focal distance f2. It is considered possible to perform adjustment so that the beam waist comes to be arranged on the projection plane 143 by changing the relative distance of the condensing lens 141 and the diverging lens 142 between the point A and the point B.

However, in the constitution shown in FIG. 15A, when the distance between the condensing lens 141 and the diverging lens 142 is changed, the exit angle of being emitted from the diverging lens 142, that is to say, the scan angle, changes in accordance with the change in this distance.

Specifically, in the case of the projection plane 143 being far from the diverging lens 142 as shown in FIG. 15B, the scan angle θ' becomes small compared to the case of the projection plane 143 being near as shown in FIG. 15C. This leads to impairment of the advantage of the scanning-type image display device, namely an image being projected large in proportion to the projection distance.

As shown in FIG. 15D, the optical path differs for the two beams 144 and 145 which have different scan angles θ'. In this case, in order to arrange the beam waist of the beams with different optical path lengths (for example, beams 144 and 145) both on the projection plane 143, for example it is conceivable to perform control that changes the distance between the condensing lens 141 and the diverging lens 142 in synchronization with the variation of the scan angle θ'. However, when constituted in this manner, the magnification of the scan angle θ' (the exit angle from the diverging lens 142 with respect to the entry angle of entering the condensing lens 141 from the scanning unit 131) ends up changing. For that reason, there is the problem of independently controlling the beam waist adjustment and the scan angle adjustment being difficult. For that reason, easily displaying a high-definition image that is in focus through the entire screen on the projection plane 143 has been difficult.

The present invention was achieved in view of the above problems. One example of an object of the present invention is to provide a scanning device that, in addition to securing a large scanning range on the projection plane, can display a high-definition image that is in focus through the entire screen on a projection plane, and to provide an image display device, and a method therefor.

Means for Solving the Problem

In order to solve the aforementioned problems, a scanning device according to the present invention, that scans a beam emitted from a light source, includes: a beam condensing unit that condenses the beam emitted from the light source; a beam diverging unit that is arranged on an output side of the beam condensing unit, and diverges the beam condensed by the beam condensing unit; a first scanning unit that is arranged between the beam condensing unit and the beam diverging unit, and scans the beam condensed by the beam condensing unit; and a moving unit that moves at least one of the beam condensing unit and the beam diverging unit along respective optical axis directions thereof, in accordance with a scan angle of the first scanning unit.

Effect of the Invention

According to the present invention, by arranging the beam diverging unit on the emission side of the first scanning unit, it is possible to make the exit angle of the beam emitted from the beam diverging unit larger than the entry angle of the beam entering the beam diverging unit from the first scanning unit. For that reason, it is possible to make the scanning range at the projection plane larger than the scan angle of the first scanning unit.

In particular, by moving either one of the beam condensing unit and the beam diverging unit along the respective optical axis directions thereof in accordance with the scan angle of the first scanning unit, it is possible to display a high-definition image that is in focus throughout the entire screen on the projection plane, in addition to securing a large scanning range on a projection plane.

EMBODIMENTS FOR CARRYING OUT THE INVENTION

Next, exemplary embodiments of the present invention shall be described with reference to the drawings. In the following description, the same reference symbols shall be given to constitutions that have the same function, with the descriptions thereof being omitted.

First Exemplary Embodiment (Scanning Device)

Figure 1:
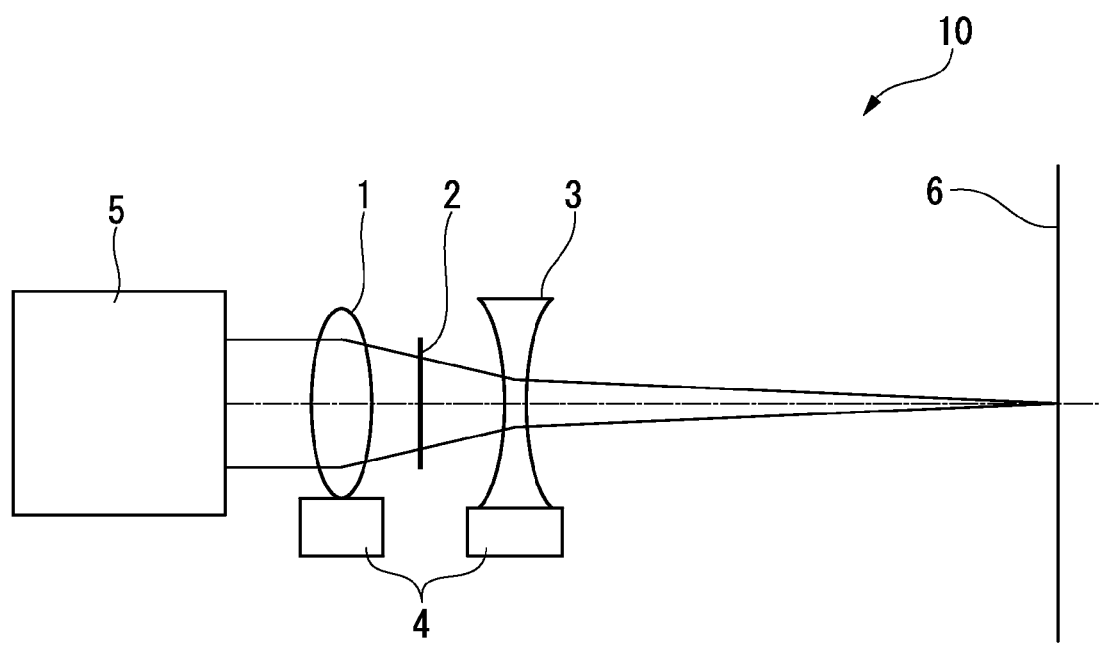
FIG. 1 is a schematic constitution diagram that shows the constitution of a scanning device in a first exemplary embodiment of the present invention.

FIG. 1 is a schematic constitution diagram that shows the constitution of a scanning device in a first exemplary embodiment of the present invention.

As shown in FIG. 1, a scanning device 10 of the present exemplary embodiment includes a laser light source 5, a condensing lens (beam condensing unit) 1, a scanning unit (first scanning unit) 2, a diverging lens (beam diverging unit) 3, and a moving unit 4. The laser light source 5 emits a laser light (beam). The condensing lens 1 condenses the laser light emitted by the laser light source 5. The laser light emitted from the condensing lens 1 is made incident on the scanning unit 2, which scans the laser light. The diverging lens 3 causes the laser light scanned by the scanning unit 2 to diverge. The moving unit 4 causes the condensing lens 1 and the diverging lens 3 to independently move along their respective optical axis directions.

In this scanning device 10, after the laser light emitted from the laser light source 5 is condensed by the condensing lens 1 and scanned by the scanning unit 2, it is diverged by the diverging lens 3 and projected on a focal plane 6.

Figure 2A:
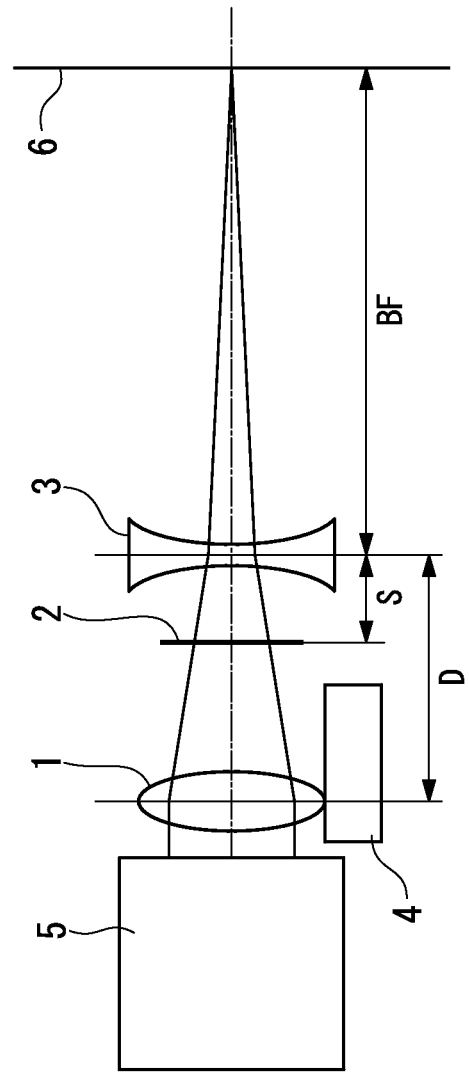
FIG. 2A is a schematic constitution diagram of a scanning device corresponding to the scanning device shown in FIG. 1, and is an explanatory diagram for explaining the principle of operation of the scanning device.
Figure 2B:
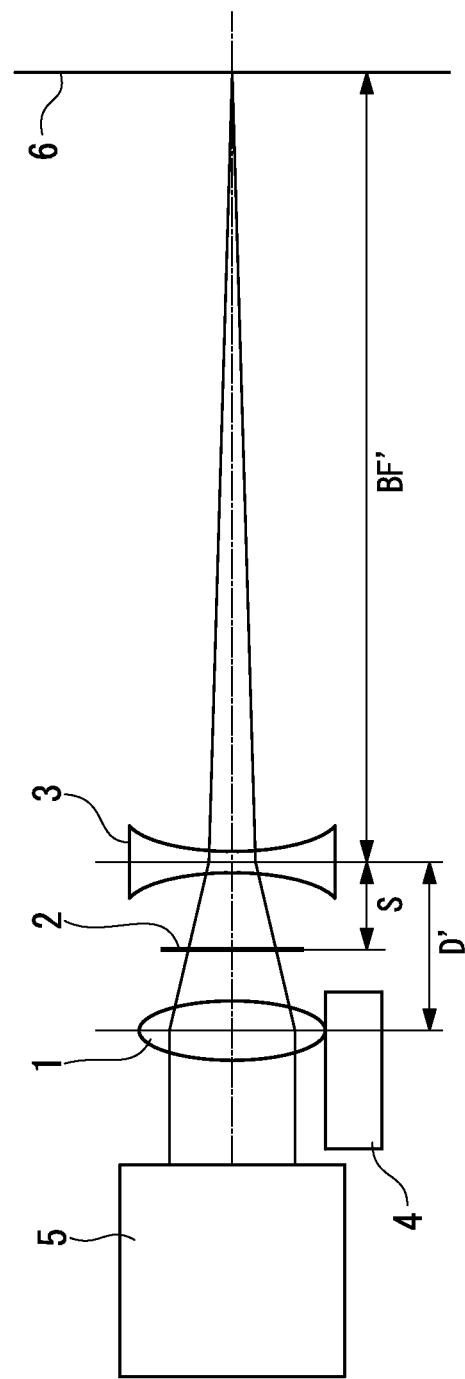
FIG. 2B is a schematic constitution diagram of the scanning device corresponding to the scanning device shown in FIG. 1, and is an explanatory diagram for explaining the principle of operation of the scanning device.

FIG. 2A and FIG. 2B are schematic constitution diagrams of the scanning device corresponding to the scanning device shown in FIG. 1, and are explanatory diagrams for explaining the principle of operation of the scanning device. The following operation is an operation that causes only the condensing lens 1 to move, in the state of maintaining a spacing s between the diverging lens 3 and the scanning unit 2. For this reason, in FIG. 2A and FIG. 2B, the illustration of the moving unit 4 of the diverging lens 3 is omitted.

In FIG. 2A, the lens spacing (the spacing on the optical axis of the laser light) between the condensing lens 1 and the diverging lens 3 is set to D, and the spacing between the scanning unit 2 and the diverging lens 3 is set to s. In this case, the distance from the diverging lens 3 to the focal plane 6, that is to say, the back focus, is set to BF.

In FIG. 2B, while uniformly maintaining the spacing s between the scanning unit 2 and the diverging lens 3, the condensing lens 1 is made to move to the emission side in the optical axis direction by the moving unit 4, with respect to the state shown in FIG. 2A. In this case, the lens spacing between the condensing lens 1 and the diverging lens 3 is set to D' (D>D').

If the spacing between the condensing lens 1 and the diverging lens 3 changes from the lens spacing D in FIG. 2A to the lens spacing D' in FIG. 2B, the back focus will change from BF to BF', whereby the focal distance will change (BF<BF'). In the case of expressing the focal distances of the condensing lens 1 and the diverging lens 3 as fd and fc, respectively, the relationship between the lens spacing D and the back focus BF is given by the following Equation 1.

$$\frac{1}{fd} = \frac{1}{fc - D} + \frac{1}{BF}$$ [Equation 1]

Figure 3:
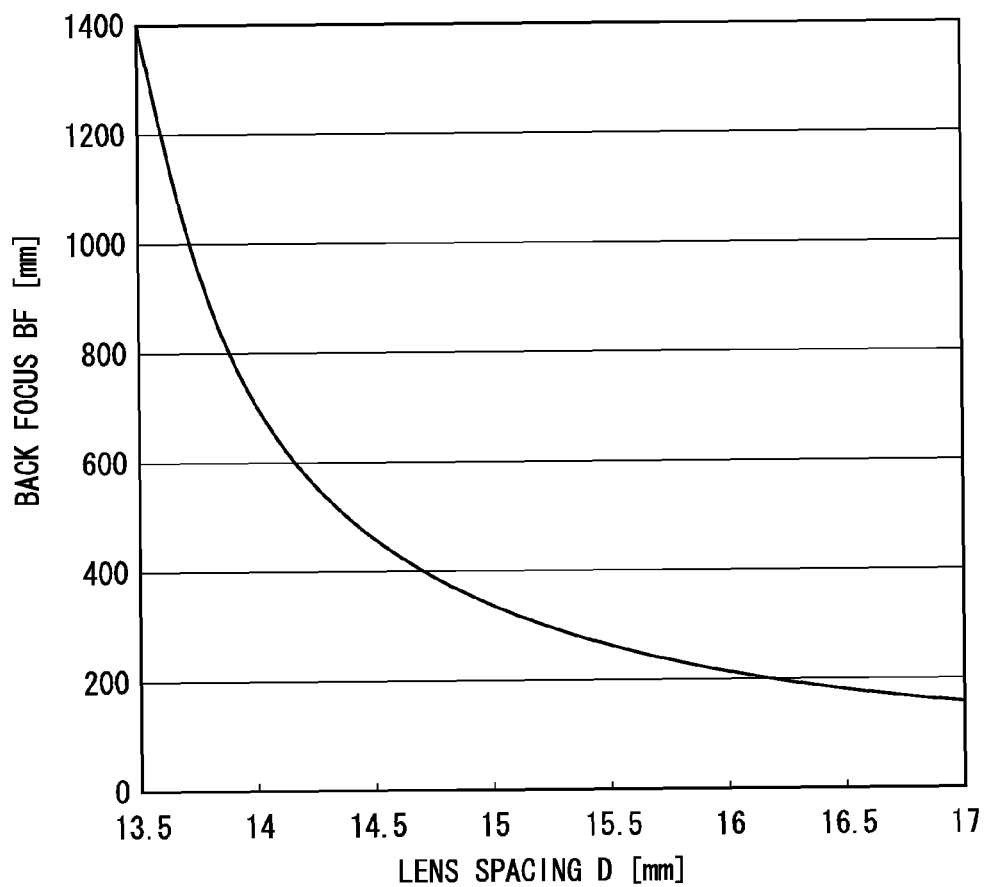
FIG. 3 is a graph that shows the relationship between a lens spacing D and a back focus BF in the first exemplary embodiment of the present invention.

FIG. 3 is a graph that shows the relationship between the lens spacing D and the back focus BF in the case of the focal distance fc of the condensing lens 1 being 40 mm and the focal distance fd of the diverging lens 3 being −27 mm.

As shown in FIG. 3, when the lens spacing D is moved 2 mm from 14 mm to 16 mm, based on Equation 1 given above, it is apparent that the back focus BF greatly changes from 700 mm to 220 mm.

Figure 4:
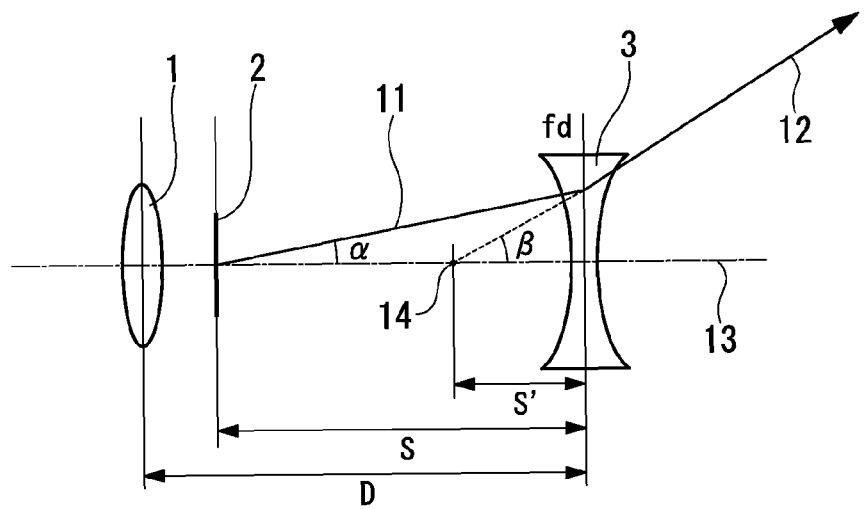
FIG. 4 is a schematic constitution diagram of a scanning device corresponding to the scanning device shown in FIG. 1, and is an explanatory diagram for explaining the scan angle magnifying power of the scanning device.

FIG. 4 is a schematic constitution diagram of a scanning device corresponding to the scanning device shown in FIG. 1, and is an explanatory diagram for explaining the scan angle magnifying power of a scanning device. Note that scan angle magnifying power refers to the power of the angle β formed by the laser light 12 emitted from the diverging lens 3 and the optical axis 13 (the emission angle from the diverging lens 3) with respect to the angle α formed by the laser light 11 that is emitted from the scanning unit 2 and the optical axis 13 of the diverging lens 3 (scanning angle of the scanning unit 2) (β/α).

As shown in FIG. 4, when the spacing between an intersection 14 of the laser light 12 and the optical axis 13 and the diverging lens 3 is s', the relationship between the spacing s', the angle α, and the angle β is given by the following Equation 2 and Equation 3. Then, when s' is cancelled from Equation 2 and Equation 3, it is possible to obtain Equation 4.

$$\frac{1}{fd} = \frac{1}{s} + \frac{1}{s'}$$ [Equation 2]

$$\frac{s'}{s} = \frac{\tan\alpha}{\tan\beta}$$ [Equation 3]

$$\frac{1}{fd} = \frac{1}{s} + \frac{\tan\beta}{s \cdot \tan\alpha}$$ [Equation 4]

If the focal distance fd of the diverging lens 3 is fixed, it is evident from Equation 4 that the scan angle magnifying power depends only on the spacing s between the scanning unit 2 and the diverging lens 3. Therefore, in the present exemplary embodiment, by fixing the diverging lens 3, and moving the condensing lens 1 along the optical axis direction by the moving unit 4, the lens spacing D is made to vary in the state of the spacing s being maintained constant. For that reason, the scan angle magnifying power β/α does not change even if the lens spacing D is varied.

Figure 5:
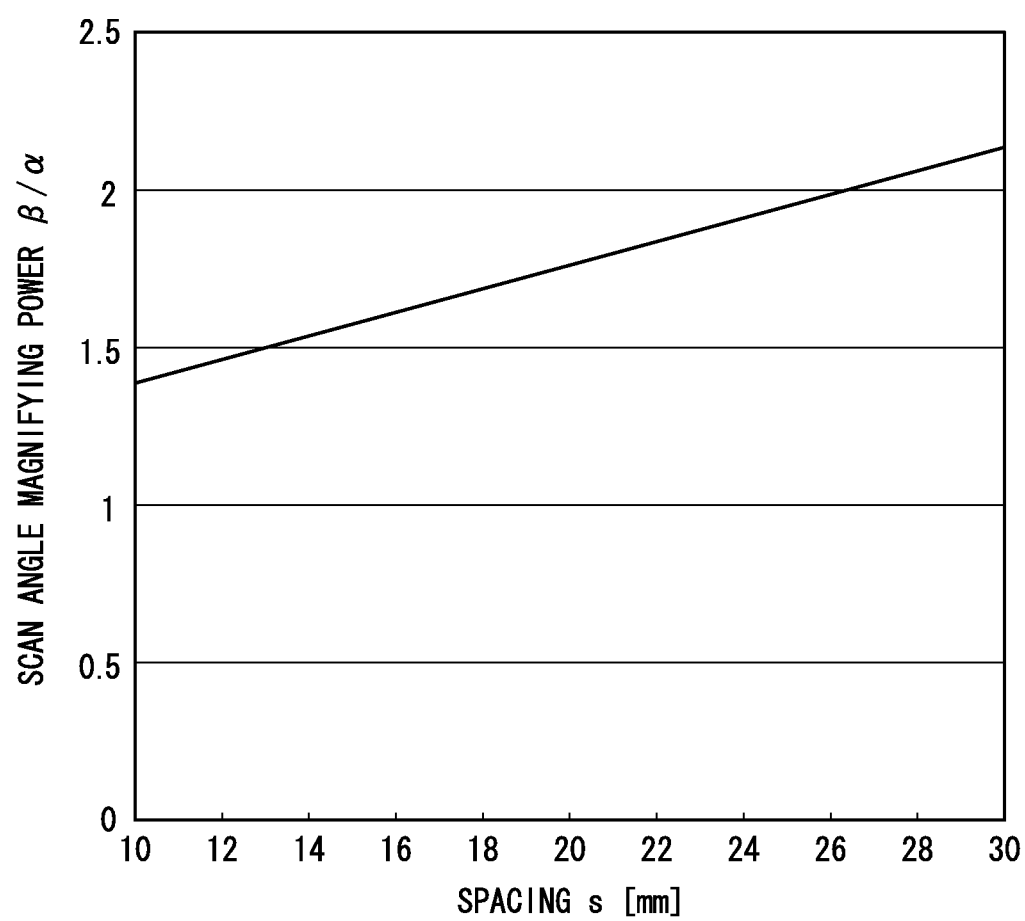
FIG. 5 is a graph that shows the relationship between a spacing s and scan angle magnifying power β/α in the first exemplary embodiment of the present invention.

FIG. 5 is a graph that shows the relationship between the spacing s and the scan angle magnifying power β/α in the case of the focal distance fc of the condensing lens 1 being 40 mm and the focal distance fd of the diverging lens 3 being −27 mm, which are the same conditions as FIG. 3.

As shown in FIG. 5, for example, if the spacing s is made 14 mm, the scan angle magnifying power β/α becomes approximately 1.5 times. In this state, when the lens spacing D is moved 2 mm from 14 mm to 16 mm by moving the condensing lens 1, it is possible to change the back focus BF from 700 mm to 220 mm as shown in FIG. 3, with the scan angle magnifying power β/α remaining approximately 1.5 times.

(Image Display Device)

Figure 6A:
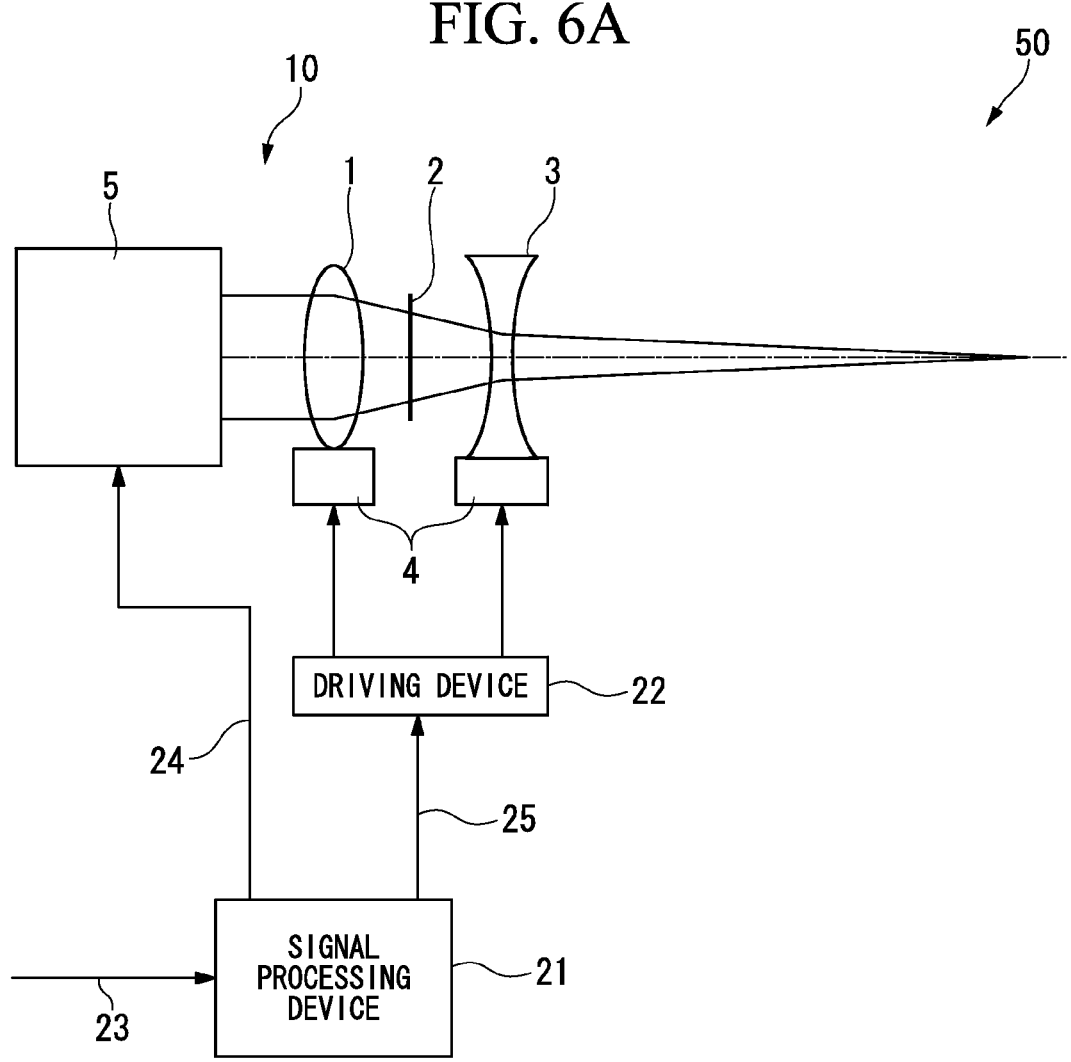
FIG. 6A is a schematic constitution diagram that shows an image display device in the first exemplary embodiment of the present invention.
Figure 6B:
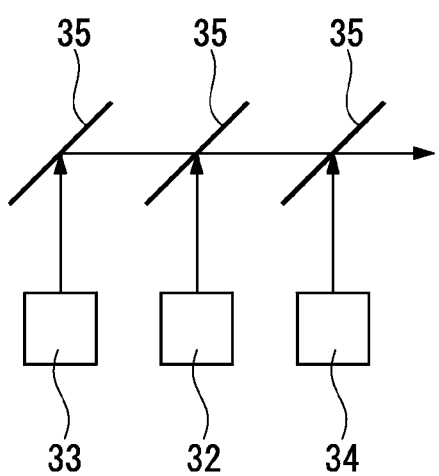
FIG. 6B is a schematic constitution diagram that shows the image display device in the first exemplary embodiment of the present invention.

FIG. 6A and FIG. 6B are schematic constitution diagrams showing the image display device of the present exemplary embodiment.

As shown in FIG. 6A, the image display device 50 of the present exemplary embodiment includes the scanning device 10 mentioned above, a signal processing device (signal processing unit) 21, and a driving device 22. The signal processing device 21 divides a video signal 23 into a modulating signal 24 and a synchronizing signal 25. The driving device 22 drives the moving unit 4 based on the synchronizing signal 25 outputted from the signal processing device 21. The synchronizing signal 25 causes the moving unit 4 to be driven according to the scan angle α of the scanning unit 2. In the image display device 50 of the present exemplary embodiment, the image definition is set to 1280 horizontal pixels and 1024 vertical pixels, and the screen size is set to 160 cm horizontal and 120 cm vertical, at a projection distance of 100 cm. However, the image definition may be set to other pixel counts.

As shown in FIG. 6B, the laser light source 5 includes a red laser 32, a green laser 33, a blue laser 34, and color combining units 35. The red laser 32 generates red laser light. The green laser 33 generates green laser light. The blue laser 34 generates blue laser light. The color combining unit 35 may be a dichroic mirror that combines the output lights of the lasers 32 to 34.

A semiconductor laser with a wavelength of 640 nm is suitably used for the red laser 32, and a semiconductor laser with a wavelength of 440 nm is suitably used for the blue laser 33. Modulation of the red laser 32 and the blue laser 33 is performed by current control.

A laser light source of 532 nm that is the second harmonic of an infrared laser with a wavelength of 1064 nm is suitably used for the green laser 34. An acousto-optical device is used for modulation of the green laser 34. In addition, modulation of the green laser 34 may use a method that modulates an infrared laser to convert it to a second harmonic, and a fiber laser or a semiconductor laser may also be used. The beam diameters of the lasers 32 to 34 are around 900 μm.

In the case of a semiconductor laser serving as the light source, a high-frequency current (for example, with a frequency of around 300 MHz) may be superimposed on the video modulation current of the laser light, with the aim of reducing speckle.

For the intensity modulation of the lasers, it is possible to use various optical modulators, such as a grating-type MEMS modulator, a waveguide-type modulator, and an electro-optical crystal, and the like. Furthermore, laser intensity modulation may be performed by performing pulse-width modulation within the time for scanning one pixel. The lasers 32 to 34 perform light emission timing/intensity modulation in 2 ns units, which is one-sixth or less of the pixel clock (12.7 ns), in synchronization with the scanning unit 2.

In the case of causing the scanning unit 2 to perform horizontal scanning, a resonance-type micromechanical scanning element is used as the scanning unit 2. The resonance-type micromechanical scanning element is used for reciprocal scanning, and is driven with a swing angle of ±20°, and a frequency of 31 KHz. As the resonance-type micromechanical scanning element, it is preferable to use a rounded mirror with a diameter of 1400 μm that can tolerate being driven at 31 KHz.

In the case of causing the scanning unit 2 to perform vertical scanning, a galvano-mirror is used as the scanning unit 2. The galvano-mirror is driven by a sawtooth wave with a swing angle of ±15°, and 60 Hz. In this case, as the galvano-mirror, it is preferable to use a rectangular mirror with a size of 1500 μm×6000 μm.

For horizontal scanning and vertical scanning, acousto-optical devices, electro-optical crystals and the like may be used, and an optical system that increases the swing angle by a prism using a photonic crystal may be provided. The size of the beam deflection unit (mirror or the like) of the element in the horizontal scanning and vertical scanning may be another size/shape provided it is larger than the diameter of the beam that is collimated.

In the image display device 50 of present exemplary embodiment, when the video signal 23 is input to the signal processing device 21, the video signal 23 is separated into the modulating signal 24 and the synchronizing signal 25 by the signal processing device 21. The modulating signal 24 is input to the laser light source 5, and modulates the laser light source 5 in synchronization with the synchronizing signal 25. The synchronizing signal 25 is inputted into the driving device 22, and drives the moving unit 4 according to the timing of the synchronizing signal 25.

(Method of Operating Image Display Device)

Figure 7A:
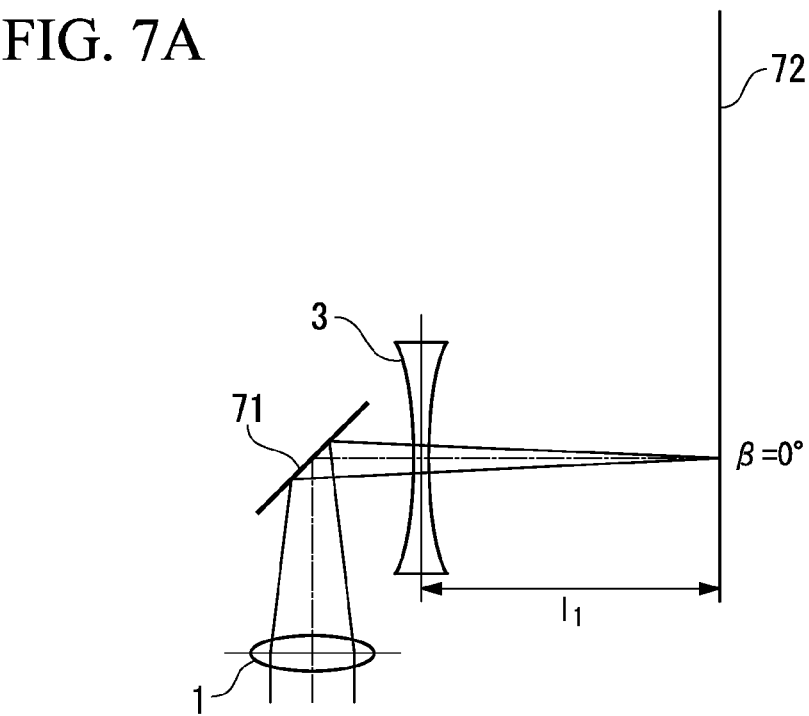
FIG. 7A is an explanatory diagram for explaining operation of the image display device in the first exemplary embodiment of the present invention.
Figure 7B:
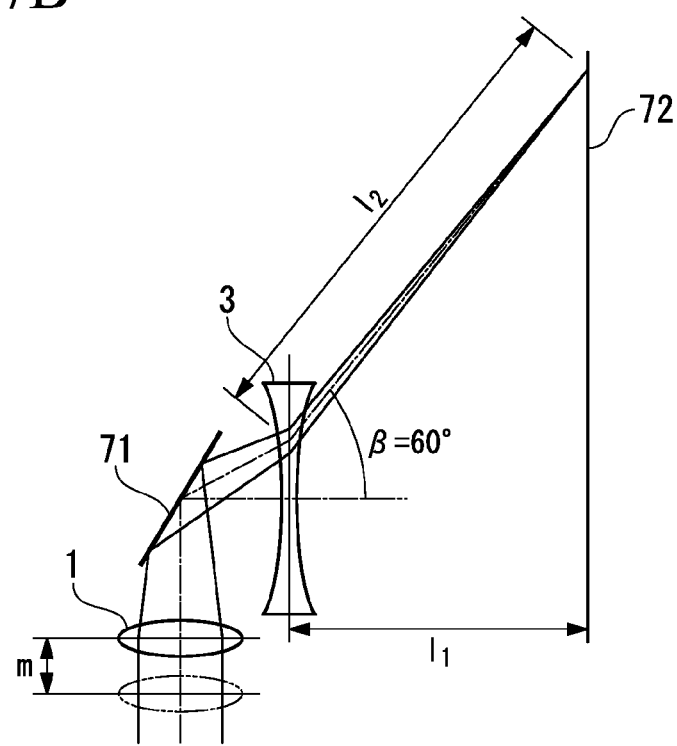
FIG. 7B is an explanatory diagram for explaining the operation of the image display device in the first exemplary embodiment of the present invention.
Figure 7C:
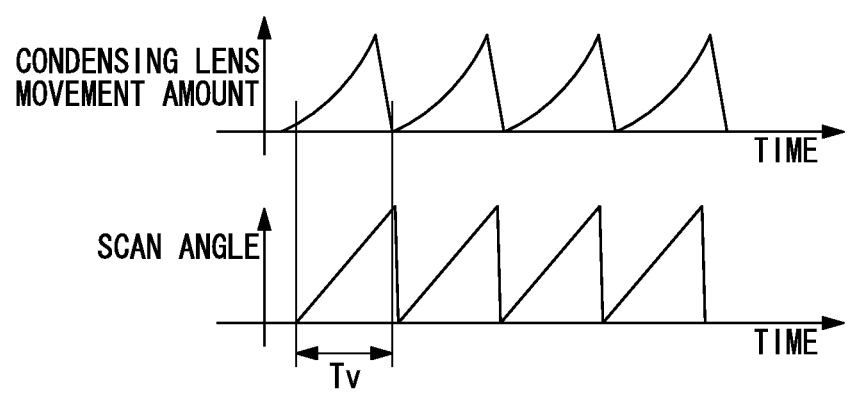
FIG. 7C is an explanatory diagram for explaining the operation of the image display device in the first exemplary embodiment of the present invention.

FIGS. 7A to 7C are explanatory diagrams for explaining the operation of the image display device mentioned above. The following description explains the case where vertical scanning of the laser light is carried out with the scanning device 10. That is to say, in the scanning device 10 shown in FIGS. 7A to 7C, the condensing lens 1 and the diverging lens 3 are arranged so that their mutual optical axes intersect perpendicularly, and the vertical scanning unit 71 is arranged at the intersection of the optical axes of the lenses 1 and 3. The reference symbol 72 denotes the projection plane where the laser light that is emitted from the diverging lens 3 is projected. The focal distance fc of the condensing lens 1 is 40 mm, and the focal distance fd of the diverging lens 3 is −27 mm.

The state shown in FIG. 7A is the case of the orientation of the laser light emitted from the condensing lens 1 and deflected by the vertical scanning unit 71 (the emission angle β from the diverging lens 3) being 0°. In this case, the optical path length $l_1$ from the diverging lens 3 to the projection plane 72 is 300 mm along the horizontal direction from the diverging lens 3 (optical axis direction). The location of this projection plane 72 is arranged so that it is in agreement with the back focus BF in case the scan angle α being 0°. In FIG. 7A, the lens spacing (spacing on the optical axis) D between the condensing lens 1 and the diverging lens 3 is set to 15.2 mm.

The state of FIG. 7B is the case of the orientation of the laser light deflected by the vertical scanning unit 71 (the emission angle β from the diverging lens 3) being 60°. The optical path length $l_2$ from the diverging lens 3 to the projection plane 72 is 600 mm in this case.

For this reason, in the state of FIG. 7B, based on Equation 1 and FIG. 3, the condensing lens 1 is moved to the diverging lens 3 side (the output side of the condensing lens 1) by 1 mm (denoted by reference symbol m) from 15.2 mm to 14.2 mm. Then, the back focus BF changes from 300 mm to 600 mm, and it is possible to arrange the beam waist on the projection plane 72 (refer to FIG. 3).

FIG. 7C is a timing chart of the movement amount of the condensing lens and the scan angle of the vertical scanning unit. In the figure, Tv indicates the scanning period (cycle) of the vertical scanning element 71.

In this way, in the present exemplary embodiment, as shown in FIG. 7C, when the condensing lens 1 is made to move in accordance with Equation 1 in synchronization with the vertical scanning unit 71, it is possible to always arrange the beam waist on the projection plane 72.

It is possible to use a voice coil motor or the like for the moving unit 4 that moves the condensing lens 1. In the case of the design conditions that are shown by Equation 1, it is possible to suitably change the condensing lens 1, the focal distance fd of the diverging lens 3, and the movement amount m of the condensing lens 1. As the moving unit 4, in addition to a magnetic actuator such as a voice coil motor or the like, an electrostatic actuator such as a piezoelectric element or the like may be used.

Therefore, according to the present exemplary embodiment, by arranging the diverging lens 3 on the output side of the vertical scanning unit 71 (scanning unit 2), it is possible to make the exit angle of laser light emitted from the diverging lens 3 larger than the entry angle of the laser light that enters the diverging lens 3 from the vertical scanning unit 71. For that reason, it is possible to make the scanning range at the projection plane 72 larger than the scan angle of the vertical scanning unit 71.

In particular, by arranging the vertical scanning unit 71 between the condensing lens 1 and the diverging lens 3, and moving the converging lens 1 in accordance with the scan angle α of the vertical scanning unit 71, it is possible to arrange the beam waist on the projection plane 72 without changing the scan angle magnifying power β/α.

That is to say, even though the distance between the condensing lens 1 and the diverging lens 3 is changed in order to arrange the beam waist on the projection plane 72, the entry angle of the laser light that is reflected by the vertical scanning unit 71 and incident on the diverging lens 3 does not change. Therefore, the exit angle β of the laser light emitted from the diverging lens 3 with respect to the scan angle α of the vertical scanning unit 71 does not change. As a result, the scan angle adjustment of the vertical scanning unit 71 and the beam waist adjustment by movement of the condensing lens 1 can be performed in synchronization. Therefore, in addition to securing a large scanning range on the projection plane 72, it is possible to display a high-definition image that is in focus throughout the entire screen on the projection plane 72.

Figure 8A:
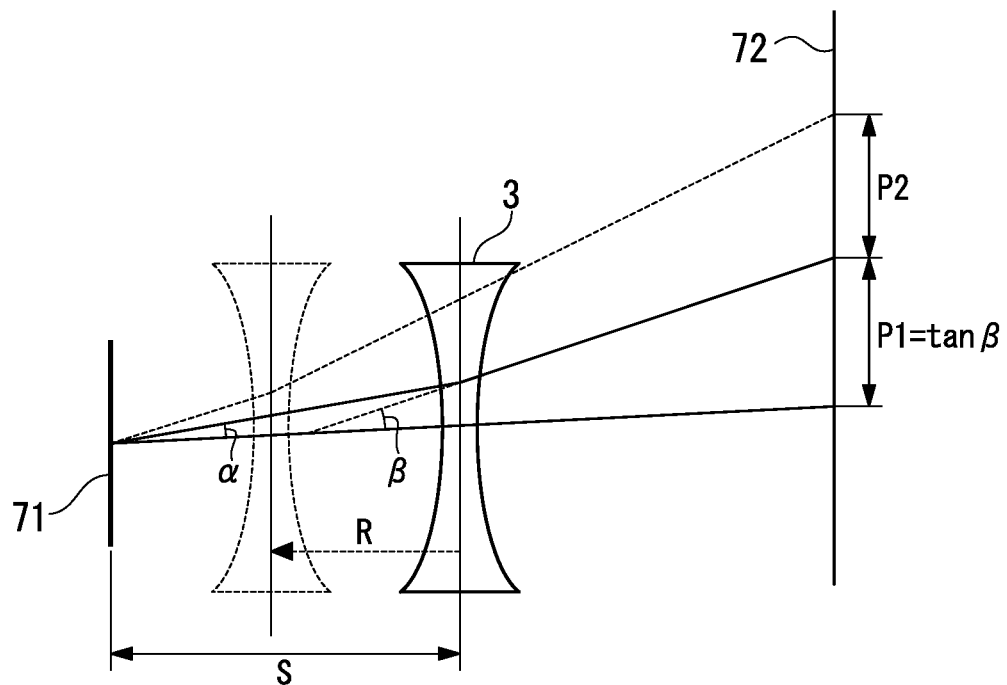
FIG. 8A is an explanatory diagram for explaining other operations of the image display device in the first exemplary embodiment of the present invention, and is a close-up that shows main portions of the image display device.
Figure 8B:
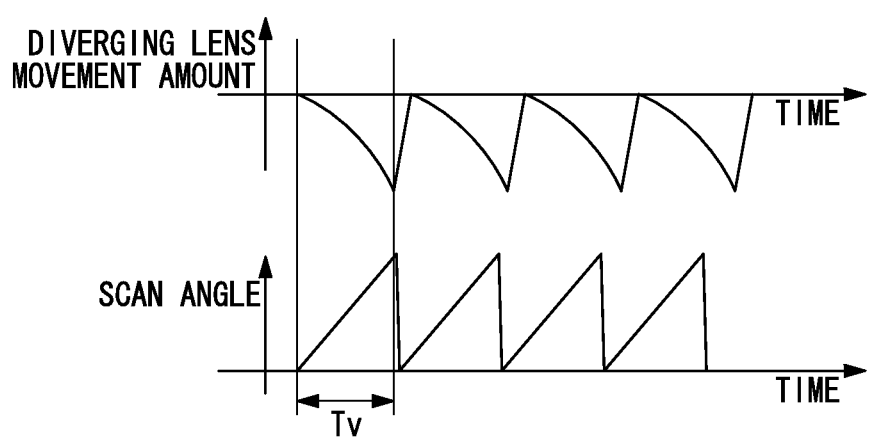
FIG. 8B is an explanatory diagram for explaining other operations of the image display device in the first exemplary embodiment of the present invention, and is a timing chart of the movement amount of the diverging lens and the scan angle of a vertical scanning unit.

FIG. 8A and FIG. 8B are explanatory diagrams for explaining other operations of the image display device. FIG. 8A is an close-up view that shows main portions of the image display device. FIG. 8B is a timing chart of the movement amount of the diverging lens and the scan angle of the vertical scanning unit.

The scan displacements P1 and P2 are scan displacements per unit time on the projection plane 72 with respect to the unit scan angle of the vertical scanning unit 71. As shown in FIG. 8A and FIG. 8B, it is possible to correct image distortion in the scanning by moving the position of the diverging lens 3 (arrow R) so that the scan displacements P1 and P2 are equal intervals. In this case, the scan displacements P1 and P2 are tangents of the angle β after the scan angle magnification (the exit angle β from the diverging lens 3). The angle β is found by the arctangent function of the scan displacement. Control of the angle β is performed by controlling the spacing s between the diverging lens 3 and the scanning unit 7 in accordance with Equation 4, and changing the scan angle magnifying power (β/α. The operation shown in FIGS. 7A to 7C given above and the operation shown in FIG. 8A and FIG. 8B may be simultaneously performed. In this case, the condensing lens 1 is moved in accordance with Equation 1 depending on the scan displacements P1 and P2.

Second Exemplary Embodiment

Next, a second exemplary embodiment of the present invention shall be described.

Figure 9A:
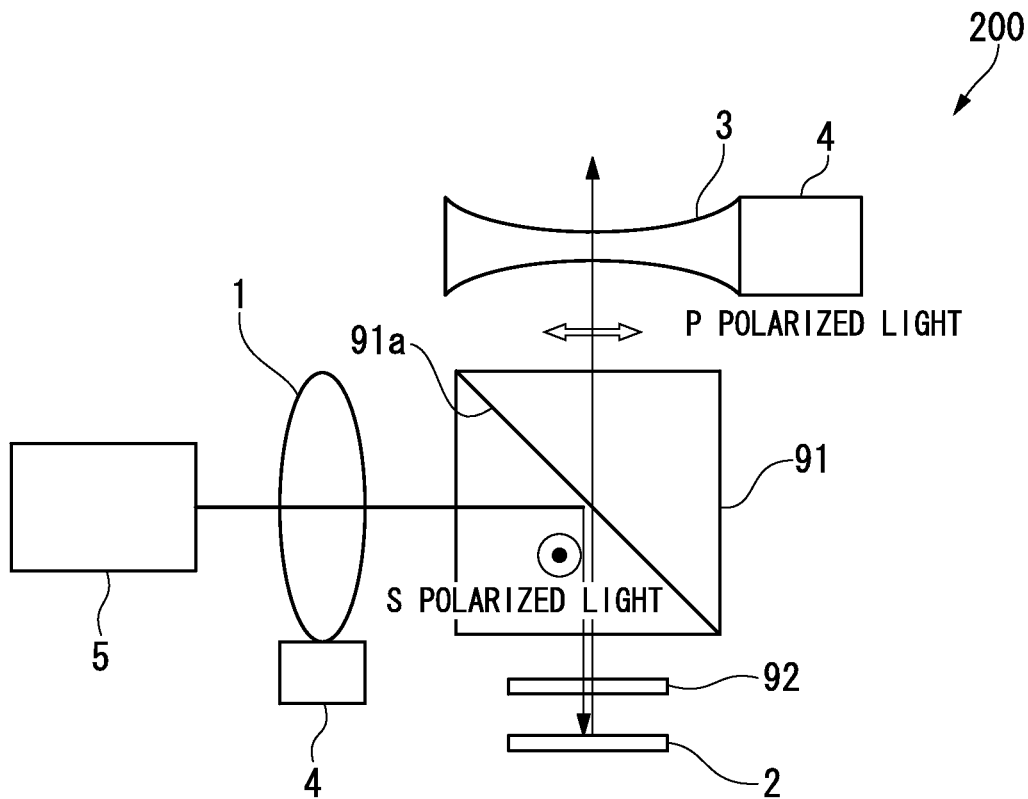
FIG. 9A is a diagram for explaining the constitution of a scanning device of a second exemplary embodiment of the present invention, and is a schematic constitution diagram of the scanning device.
Figure 9B:
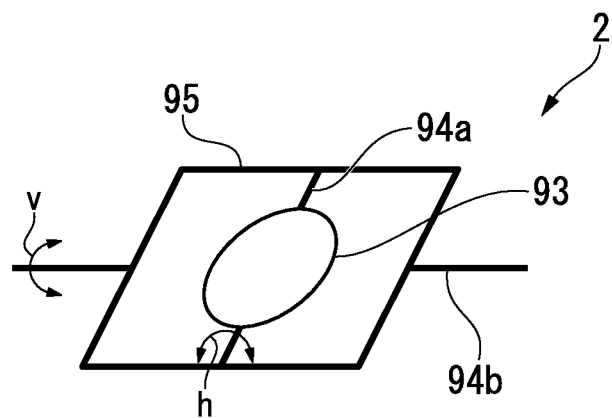
FIG. 9B is a diagram for explaining the constitution of the scanning device of the second exemplary embodiment of the present invention, and is a schematic constitution diagram of a scanning unit.

FIG. 9A and FIG. 9B are explanatory diagrams for explaining the constitution of a scanning device of the second exemplary embodiment of the present invention. FIG. 9A is a schematic constitution diagram of the scanning device. FIG. 9B is a schematic constitution diagram of the scanning unit.

As shown in FIG. 9A and FIG. 9B, in a scanning device 200 of the second exemplary embodiment, a polarizing beam splitter 91 including a polarization separation plane 91a is arranged further on the output side than the condensing lens 1. The scanning unit 2 and the diverging lens 3 are arranged further on the output side than the condensing lens 1 so as to sandwich the polarizing beam splitter 91 therebetween. In this case, the optical axis of the diverging lens 3 is arranged so as to be perpendicular with the optical axis of the condensing lens 1 at the polarization separation plane 91a. That is to say, the scanning unit 2 and the diverging lens 3 are arranged so as to be parallel with surfaces of the polarization beam splitter 91 perpendicular to the surface opposite the converging lens 1. A ¼ wavelength plate 92 is arranged between the polarizing beam splitter 91 and the scanning unit 2.

As shown in FIG. 9B, a gimbal-type scanning mirror is used in the scanning unit 2 of the present exemplary embodiment. This scanning unit 2 includes a frame 95, a scanning mirror 93, a pair of first hinges 94a, and a pair of second hinges 94b. The frame 95 has a rectangular shape in plan view. The scanning mirror 93 has a circular shape, and is arranged in the center of the frame 95. The pair of first hinges 94a respectively extend from the center of opposing sides of the frame 95 toward the center of the frame 95, and support the scanning mirror 93. The pair of second hinges 94b extend to the outer side of the frame 95 so as to be perpendicular with the extension direction of the first hinges 94a. In this kind of scanning unit 2, by turning the scanning mirror 93 about the first hinges 94a and turning the frame 95 about the second hinges 94b, it is possible to perform horizontal scanning and vertical scanning with the one scanning mirror 93. The direction going around the first hinges 94a is the horizontal scanning direction h. The direction going around the second hinges 94b is the vertical scanning direction v. The diameter of the scanning mirror 93 is formed to be around 1000 μm.

In the present exemplary embodiment, the laser light that is emitted from the laser light source 5 is S polarized light with respect to the polarization separation plane 91a of the polarizing beam splitter 91, and the laser light that is reflected by the polarization separation plane 91a becomes right-circularly polarized light by passing through the ¼ wavelength plate 92.

Afterward, the laser light that is reflected by the scanning mirror 93 of the scanning unit 2 becomes left-circularly polarized light, and passes again through the ¼ wavelength plate 92. Then, the laser light that has passed the ¼ wavelength plate 92 becomes P polarized light with respect to the polarization separation plane 91a of the polarizing beam splitter 91, and is transmitted through the polarization separation plane 91a. The laser light that is transmitted through the polarizing beam splitter 91 enters the diverging lens 3.

The present exemplary embodiment exhibits similar effect as the first exemplary embodiment described above. Moreover, according to the present exemplary embodiment, since the laser light is vertically incident on the scanning mirror 93, it is not obliquely incident in the manner of the vertical scanning unit 71 of the first exemplary embodiment described above. For that reason, it is possible to scale down the beam diameter of the laser light that is incident on the scanning mirror 93, and it is possible to reduce the size of the scanning mirror 93. Then, by reducing the size of the scanning mirror 93, it is possible to reduce the moment of inertia that acts on the scanning unit 2. As a result, it is possible to improve the scanning frequency, swing angle and the like of the scanning mirror 93, and display a high-definition image.

Also, in the present exemplary embodiment, since the optical path is doubled back between the condensing lens 1 and the diverging lens 3 by the polarizing beam splitter 91, it is possible to reduce the overall size of the scanning device.

Figure 14:
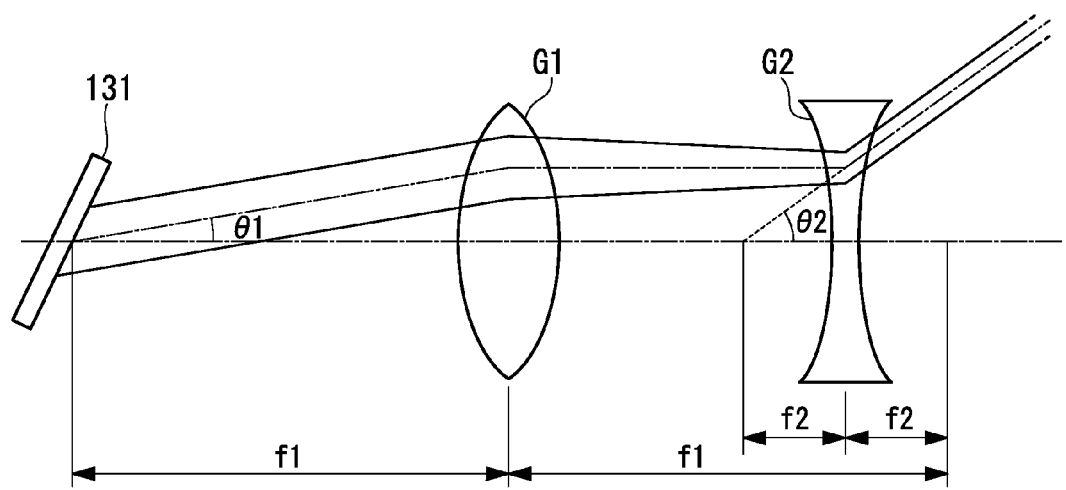
FIG. 14 is a diagram for explaining a conventional scanning device.
Figure 15A:
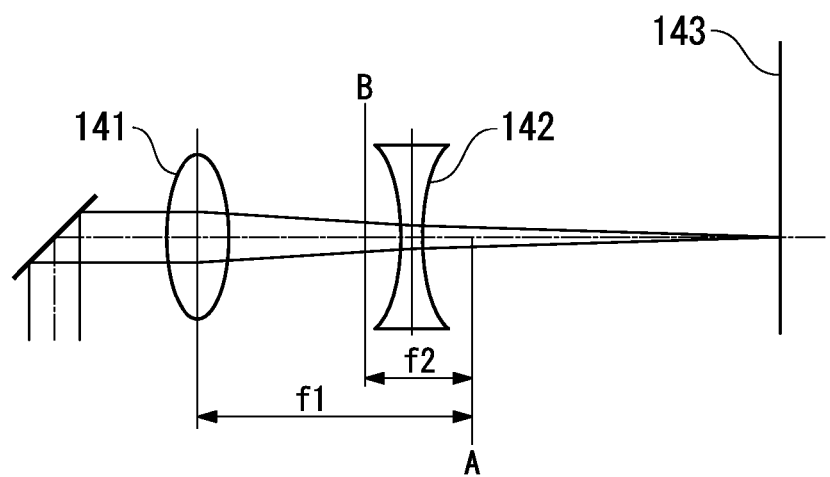
FIG. 15A is a diagram for explaining a conventional scanning device.
Figure 15B:
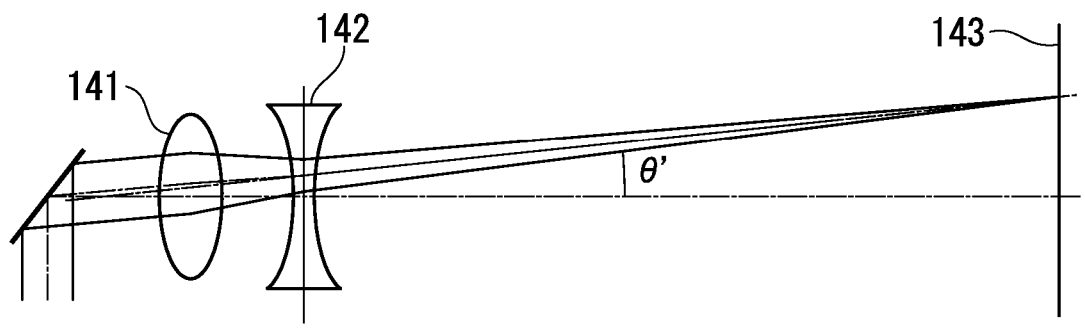
FIG. 15B is a diagram for explaining the conventional scanning device.
Figure 15C:
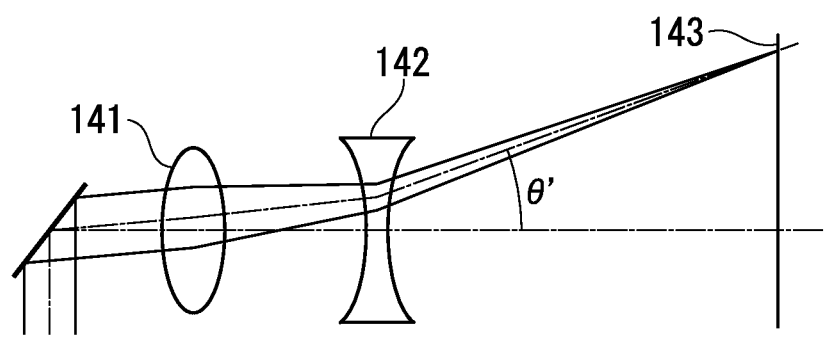
FIG. 15C is a diagram for explaining the conventional scanning device.
Figure 15D:
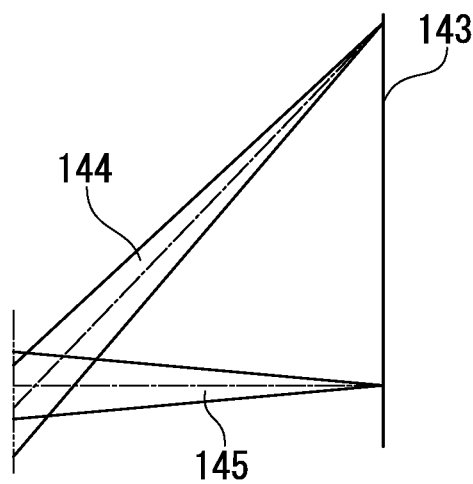
FIG. 15D is a diagram for explaining the conventional scanning device.

As the object of causing light to be vertically incident on the scanning mirror 93, in the conventional constitution shown in FIG. 14, even if the polarizing beam splitter is arranged on the output side of the scanning unit 131, it is necessary to arrange the condensing lens G1 and the diverging lens G2 after the polarizing beam splitter. For this reason, the effect of a size reduction as in the exemplary embodiment of the present invention is not obtained.

Third Exemplary Embodiment

Next, a third exemplary embodiment of the present invention shall be described.

Figure 10A:
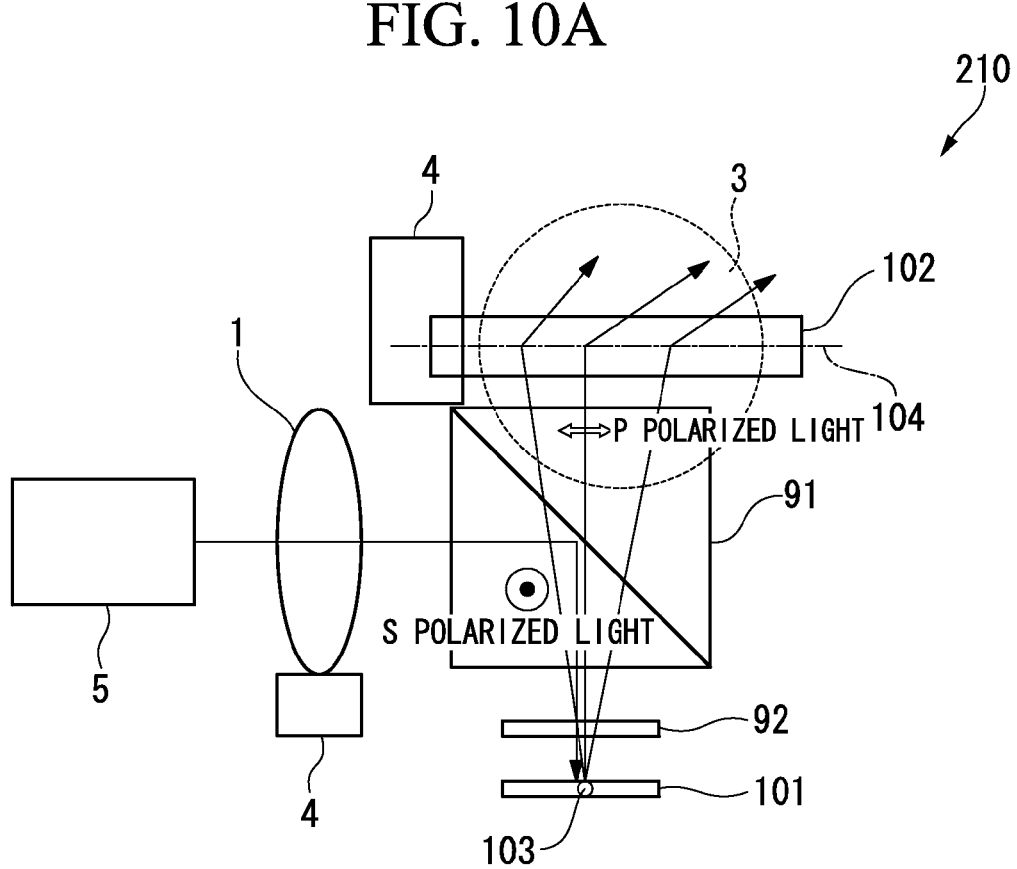
FIG. 10A is a schematic constitution diagram for explaining the constitution of a scanning device of a third exemplary embodiment of the present invention, and is a plan view of the scanning device.
Figure 10B:
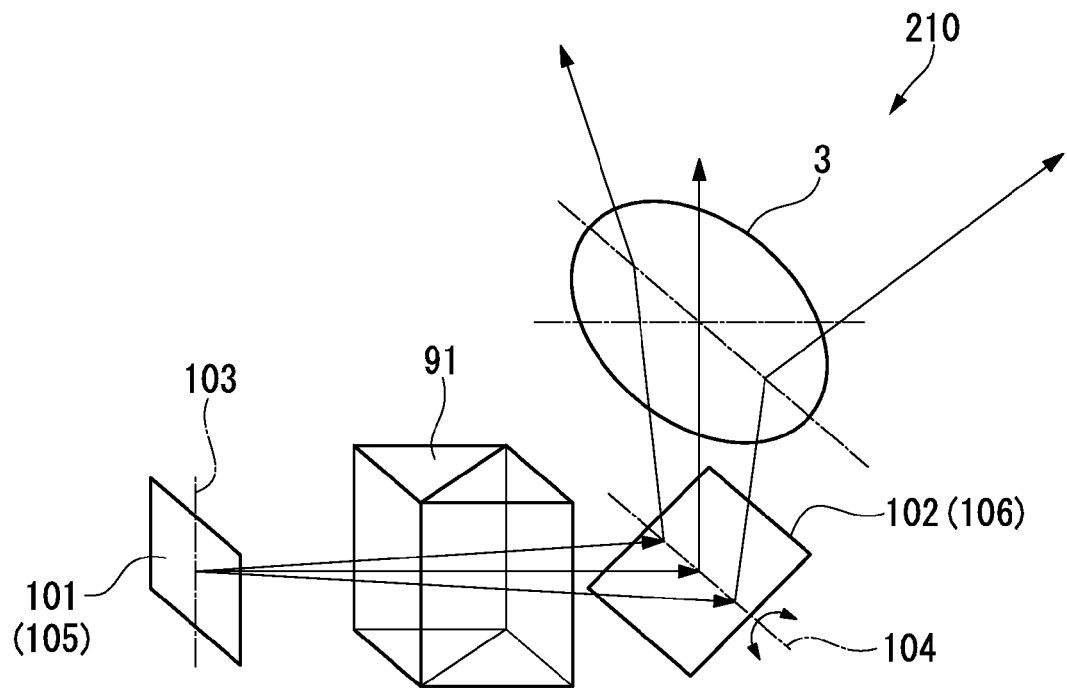
FIG. 10B is a schematic constitution diagram for explaining the constitution of the scanning device of the third exemplary embodiment of the present invention, and is a perspective view of the scanning device.

FIG. 10A and FIG. 10B are schematic constitution diagrams for describing the constitution of a scanning device of the third exemplary embodiment. FIG. 10A is a plan view of the scanning device of the third exemplary embodiment. FIG. 10B is a perspective view of the scanning device of the third exemplary embodiment.

As shown in FIG. 10A, in a scanning device 210 of the third exemplary embodiment, a horizontal scanning unit (first scanning unit) 101 and a vertical scanning unit (second scanning unit) 102 are oppositely arranged sandwiching a polarizing beam splitter 91. The horizontal scanning unit (first scanning unit) 101 horizontally scans laser light by being supported to be rotatable about a rotation shaft 103. The vertical scanning unit 102 vertically scans laser light by being supported to be rotatable about a rotation shaft 104. In the present exemplary embodiment, a resonance-type micromechanical scanning element that has a scanning mirror 105 with a diameter of 1000 µm is used for the horizontal scanning unit 101. A galvano-mirror 106 measuring 1500 µm×6000 µm is used for the vertical scanning unit 102.

The diverging lens 3 is arranged on the output side of the vertical scanning unit 102 so as to be perpendicular to the optical axis direction of the horizontal scanning unit 101.

According to the present exemplary embodiment, since the laser light is vertically incident on the scanning mirror 105 of the horizontal scanning unit 101 in the same manner as the aforementioned second exemplary embodiment, it is possible to reduce the size of the scanning mirror 105.

Also, accompanying the reduction in size of the scanning mirror 105, it is possible to reduce the moment of inertia that acts on the scanning mirror 105, and so the scanning frequency, swing angle and the like of the scanning mirror 105 improves, and it becomes possible to display a high-definition image.

Also, in the present exemplary embodiment, since the optical path is doubled back between the condensing lens 1 and the diverging lens 3 by the polarizing beam splitter 91, it is possible to reduce the overall size of the scanning device.

Fourth Exemplary Embodiment

Next, a fourth exemplary embodiment of the present invention shall be described.

Figure 11:
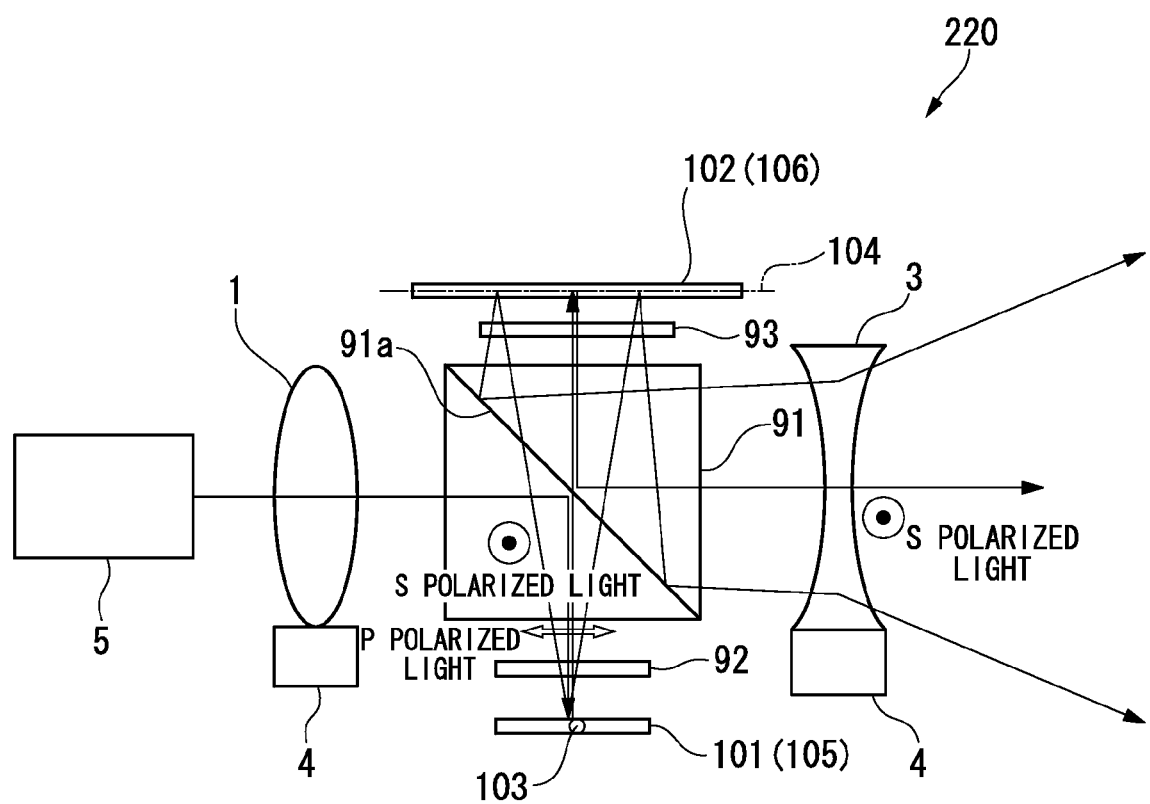
FIG. 11 is a schematic constitution diagram for explaining the constitution of a scanning device of a fourth exemplary embodiment of the present invention.

FIG. 11 is a schematic constitution diagram for describing the constitution of a scanning device of the fourth exemplary embodiment.

As shown in FIG. 11, a scanning device 220 of the fourth exemplary embodiment includes the polarizing beam splitter 91, the condensing lens 1, the diverging lens 3, the horizontal scanning unit 101, the vertical scanning unit 102, the ¼ wavelength plate 92, and a ¼ wavelength plate 93. The condensing lens 1 and the diverging lens 3 are oppositely arranged sandwiching the polarizing beam splitter 91 therebetween. The horizontal scanning unit 101 and the vertical scanning unit 102 are arranged sandwiching the polarizing beam splitter 91 therebetween so as to be perpendicular to the optical axes of the condensing lens 1 and the diverging lens 3. The ¼ wavelength plate 92 is arranged between the horizontal scanning unit 101 and the polarizing beam splitter 91. The ¼ wavelength plate 93 is arranged between the vertical scanning unit 102 and the polarizing beam splitter 91.

The laser light that is emitted from the laser light source 5 is S polarized light with respect to the polarization separation plane 91a of the polarizing beam splitter 91. The laser light that is reflected by the polarization separation plane 91a becomes right-circularly polarized light by passing through the ¼ wavelength plate 92.

Afterward, the laser light that is reflected by the scanning mirror 105 of the horizontal scanning unit 101 becomes left-circularly polarized light, and passes again through the ¼ wavelength plate 92. Then, the laser light that has passed the ¼ wavelength plate 92 becomes P polarized light with respect to the polarization separation plane 91a of the polarizing beam splitter 91, and is transmitted through the polarization separation plane 91a. And the laser light that is transmitted through the polarizing beam splitter 91 passes through the ¼ wavelength plate 93, and becomes left-circularly polarized light. The laser light that is reflected by the scanning mirror 106 of the vertical scanning unit 102 becomes right-circularly polarized light, and again passes through the ¼ wavelength plate 93 and becomes S polarized light.

Then, the laser light that has become S polarized light is reflected by the polarizing beam splitter 91, and enters the diverging lens 3.

The present exemplary embodiment exhibits similar effect as the third exemplary embodiment given above. Moreover, according to the present exemplary embodiment, since the two scanning units 101 and 102 are oppositely arranged sandwiching the polarizing beam splitter 91 therebetween, device mounting is easy.

Fifth Exemplary Embodiment

Next, a fifth exemplary embodiment of the present invention shall be described.

Figure 12A:
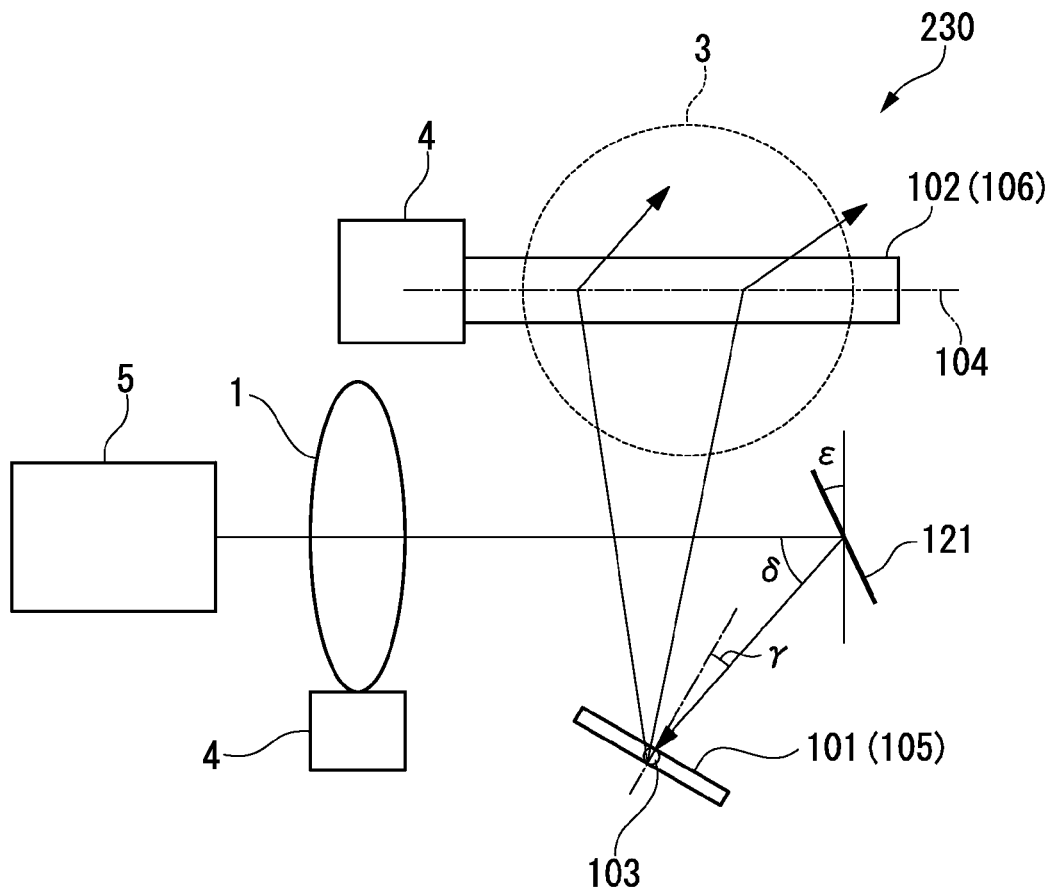
FIG. 12A is a schematic constitution diagram for explaining the constitution of a scanning device of a fifth exemplary embodiment of the present invention.
Figure 12B:
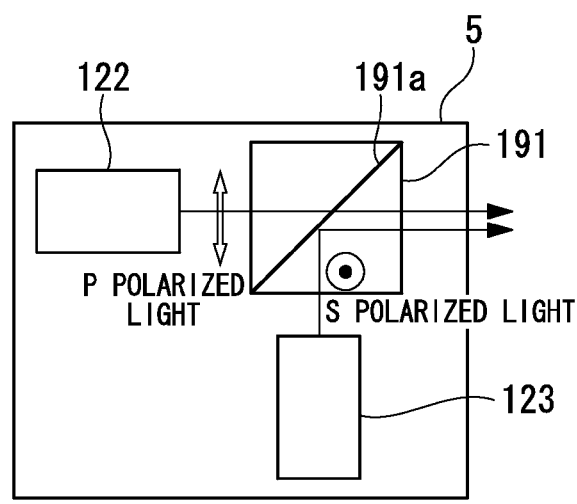
FIG. 12B is a schematic constitution diagram for explaining the constitution of the scanning device of the fifth exemplary embodiment of the present invention.

FIG. 12A and FIG. 12B are schematic constitution diagrams for describing the constitution of a scanning device of the fifth exemplary embodiment.

As shown in FIG. 12A, a scanning device 230 of the fifth exemplary embodiment of the present invention has a constitution that arranges a mirror 121 between the condensing lens 1 and the horizontal scanning unit 101. The mirror 121 is arranged so that the incident angle γ of laser light that is reflected from the mirror 121 and incident on the horizontal scanning unit 101 becomes 45° or less (in the present invention, for example γ=30°). In FIG. 12A, δ=60°, and ε=15°.

As shown in FIG. 12B, the laser light source 5 of the present exemplary embodiment includes a polarizing beam splitter (light combining unit) 191, and lasers (first light source, second light source) 122 and 133. The polarizing beam splitter 191 has a polarization separation plane 191a. The lasers 122 and 133 emit laser light toward the polarizing beam splitter 191. In this case, the laser 122 becomes P polarized light with respect to the polarization separation plane 191*a*, and the laser 123 becomes S polarized light with respect to the polarization separation plane 191*a*. That is to say, in the laser light source 5 of the present exemplary embodiment, after two laser lights whose polarization directions are perpendicular are combined by the polarizing beam splitter 191, they enter the condensing lens 3.

In the aforementioned second to fourth exemplary embodiments, in order to make the scanning mirror 105 of the horizontal scanning unit 101 as small as possible, the polarizing beam splitter 91 is used to make a constitution in which the laser light is incident (vertically incident) at an incidence angle 0°. In this case, in order to achieve an increase of the laser output, it is conceivable to have two lasers be incident on the splitter 91, and combine the laser lights of these lasers. However, in this constitution, the lasers end up separating at the polarization separation plane 91*a* of the polarizing beam splitter 91, and so an increase in the laser output cannot be expected.

In contrast to this, since the present exemplary embodiment combines the two laser lights at the stage prior to entering the condensing lens 1, and causes the combined laser light to be reflected by the mirror 121 without separating, with increasing the laser output, it is possible to display on the projection plane 72 (refer to FIGS. 7A to 7C) a high-definition image that is in focus throughout the screen.

Also, in the present invention, since the laser light is made incident on the horizontal scanning unit 101 at an incident angle of 45° or less, in addition to preventing an increase in size of the mirror 121, it is possible to perform display of an image with high definition and high brightness.

Moreover, in the present exemplary embodiment, since two laser lights with different polarization directions are combined, it is possible to provide an image in which the speckle noise that is characteristic of lasers is reduced, and the sense of incongruity to an observer is small.

Hereinabove, the present invention was described with reference to the exemplary embodiments, but the present invention is not limited to the aforementioned exemplary embodiments. It is possible to make various modifications to the constitutions and details of the present invention within the scope of the present invention that can be understood by a person skilled in the art.

Figure 13:
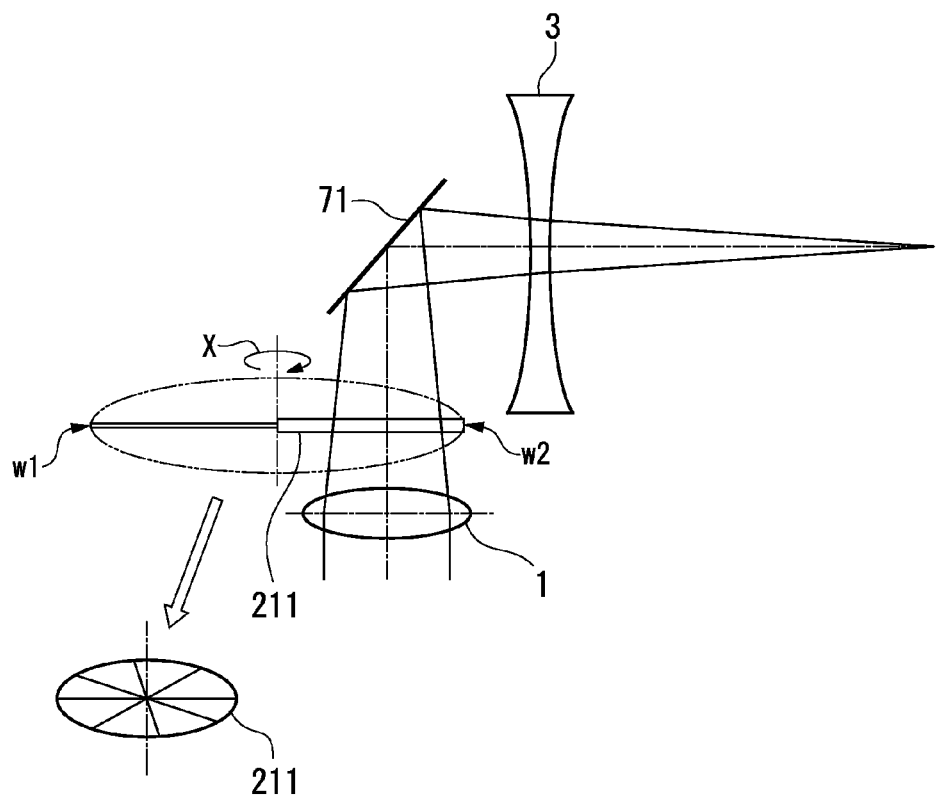
FIG. 13 is a schematic constitution diagram of a scanning device that shows the constitution of another exemplary embodiment of the present invention.

For example, in the first exemplary embodiment, the case was described of changing the distance between the condensing lens 1 and the vertical scanning unit 71 by the moving unit 4, but it is not limited to this constitution. For example, a rotating wheel 211 that is comprised by glass that is formed so that the thickness differs along the circumferential direction as shown in FIG. 13 (w1: glass thickness small, w2: glass thickness large) may be used, and by causing this rotating wheel 211 to rotate about the rotation axis X, the optical path length may be switched. Using a liquid crystal with homogeneous alignment, an electro-optical element may also be used to electrically change the optical length.

The operation of the scanning devices 200, 210, 220, and 230 of the second to fifth exemplary embodiments is similar to the scanning device 10 of the first exemplary embodiment. Using these scanning devices 200, 210, 220, and 230, the projection-type image display device 50 similar to the first exemplary embodiment may be constituted.

This application is based upon and claims the benefit of priority from Japanese patent application No. 2009-283219, filed on Dec. 14, 2009, the disclosure of which is incorporated herein in its entirety by reference.

INDUSTRIAL APPLICABILITY

The present invention can be applied to a scanning device, an image display device, and a method therefor. Such a scanning device, an image display device and a method therefore can, in addition to securing a large scanning range on a projection plane, display a high-definition image that is in focus throughout the screen on a projection plane.

DESCRIPTION OF REFERENCE SYMBOLS

1 Condensing lens (beam condensing unit)
2 Scanning unit (first scanning unit)
3 Diverging lens (beam diverging unit)
4 Moving unit
5 Laser light source (light source)
21 Signal processing device (signal processing unit)
71, 102 Vertical scanning unit (first scanning unit)
72 Projection plane
91 Polarizing beam splitter
92 ¼ wavelength plate
101 Horizontal scanning unit (second scanning unit)
122 Laser (first light source)
123 Laser (second light source)
191 Polarizing beam splitter (light combining unit)

The invention claimed is:

1. A scanning device that scans a beam emitted from a light source, the scanning device comprising:
    a beam condensing unit that condenses the beam emitted from the light source;
    a beam diverging unit that is arranged on an output side of the beam condensing unit, and diverges the beam condensed by the beam condensing unit;
    a first scanning unit that is arranged between the beam condensing unit and the beam diverging unit, and scans the beam condensed by the beam condensing unit;
    a moving unit that moves at least one of the beam condensing unit and the beam diverging unit along respective optical axis directions thereof, in accordance with a scan angle of the first scanning unit;
    a polarizing beam splitter that is arranged between the beam condensing unit and the first scanning unit; and
    a ¼ wavelength plate that is arranged between the polarizing beam splitter and the first scanning unit.

2. The scanning device according to claim 1, wherein a second scanning unit is arranged between the polarizing beam splitter and the beam diverging unit.

3. A scanning device that scans a beam emitted from a light source, the scanning device comprising:
    a beam condensing unit that condenses the beam emitted from the light source;
    a beam diverging unit that is arranged on an output side of the beam condensing unit, and diverges the beam condensed by the beam condensing unit;
    a first scanning unit that is arranged between the beam condensing unit and the beam diverging unit, and scans the beam condensed by the beam condensing unit;
    a moving unit that moves at least one of the beam condensing unit and the beam diverging unit along respective optical axis directions thereof, in accordance with a scan angle of the first scanning unit; and
    a mirror that is arranged between the beam condensing unit and the first scanning unit, wherein the mirror is arranged so that an incident angle to the first scanning unit is less than 45 degrees.

4. The scanning device according to claim 3, wherein the light source includes a first light source and a second light source that emit beams whose polarization directions are perpendicular to each other; and the light source further includes a light combining unit between the first light source and
the second light source, and the beam condensing unit, a light combining unit combining the beams emitted from the first light source and the second light source.

5. A method for controlling an image display device which displays an image by scanning a beam on an external projection plane, the method comprising:
  emitting a beam from a light source;
  condensing the emitted beam by using a beam condensing unit;
  diverging the condensed beam by using a beam diverging unit that is arranged on an output side of the beam condensing unit;
  reflecting the diverged beam by using a mirror so that an incident angle to a first scanning unit is less than 45 degrees, the minor being arranged between the beam condensing unit and the beam diverging unit;
  moving at least one of the beam condensing unit and the beam diverging unit along respective optical axis directions according to a scan angle of the first scanning unit; and
  changing a distance between the beam condensing unit and the first scanning unit so as to position a beam focus point within a predetermined projection plane.

6. The scanning device according to claim 3, wherein the moving unit moves the beam condensing unit so that a focal point of the beam is positioned on a projection plane, in accordance with the scan angle of the first scanning unit.

7. The scanning device according to claim 3, wherein
  the moving unit moves the beam diverging unit so that scan displacements per unit time are equal intervals on a projection plane, in accordance with the scan angle of the first scanning unit.

* * * * *

UNITED STATES PATENT AND TRADEMARK OFFICE
CERTIFICATE OF CORRECTION

PATENT NO. : 8,913,314 B2  
APPLICATION NO. : 13/515716  
DATED : December 16, 2014  
INVENTOR(S) : Hiroshi Imai Page 1 of 1

It is certified that error appears in the above-identified patent and that said Letters Patent is hereby corrected as shown below:

In the Specification,

Column 9, Line 58: Delete "($\beta/\alpha$." and inset -- ($\beta/\alpha$). --

In the Claims,

Column 15, Line 17: In Claim 5, delete "minor" and insert -- mirror --

Signed and Sealed this  
Eighteenth Day of August, 2015

Michelle K. Lee  
*Director of the United States Patent and Trademark Office*